(No Model.) 2 Sheets—Sheet 1.
A. L. ROHRER & G. W. MANSFIELD.
SWITCHBOARD FOR POWER STATIONS.
No. 508,641. Patented Nov. 14, 1893.
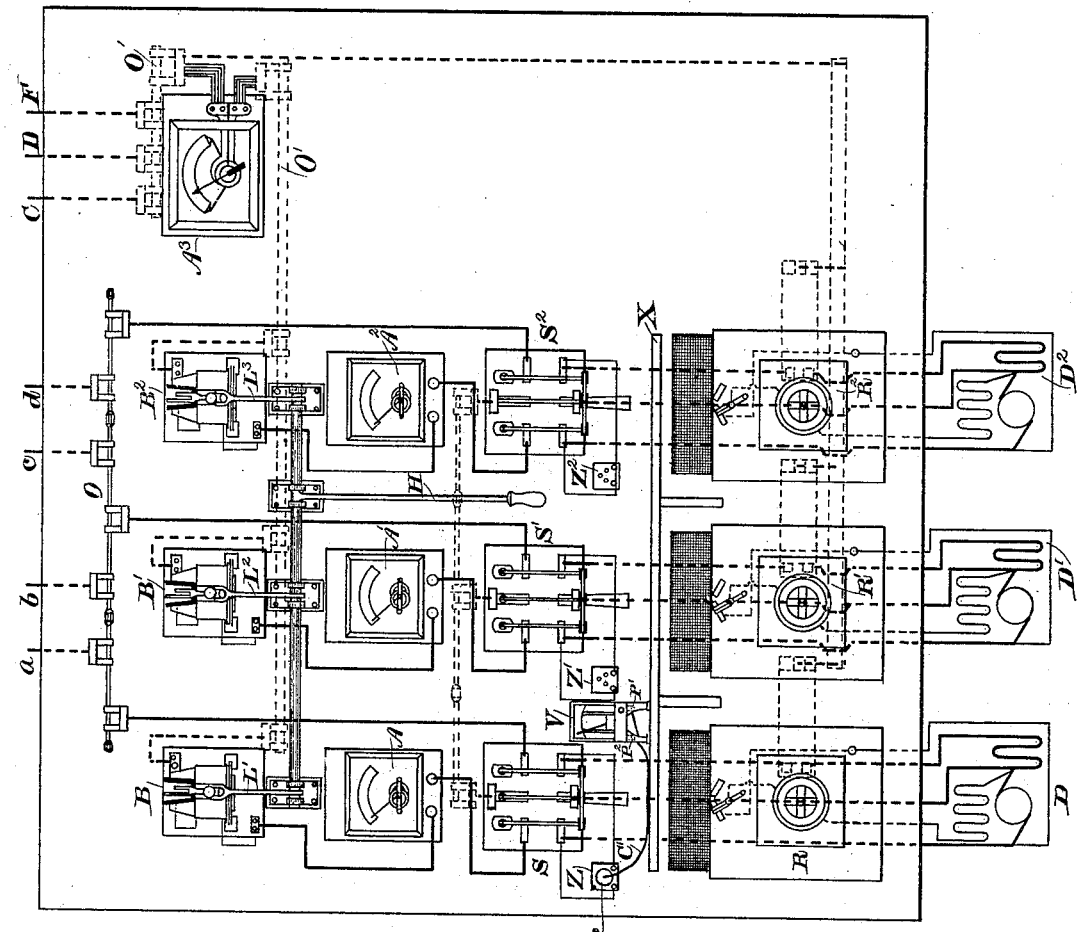
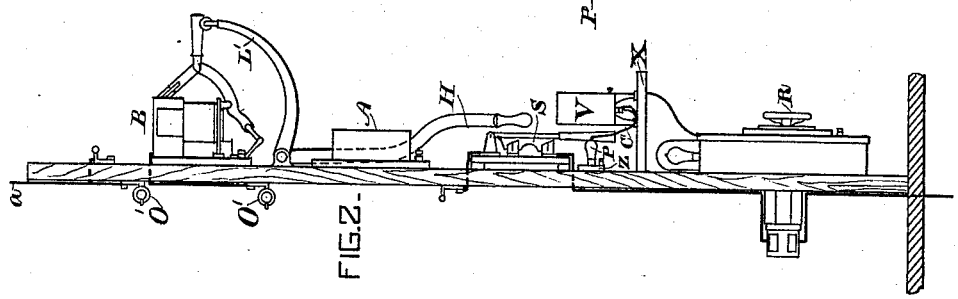
WITNESSES.
INVENTORS.

(No Model.) 2 Sheets—Sheet 2.

A. L. ROHRER & G. W. MANSFIELD.
SWITCHBOARD FOR POWER STATIONS.

No. 508,641. Patented Nov. 14, 1893.

WITNESSES.
Aleck Macdonald
John W. Gibboney

INVENTORS.
Albert L. Rohrer
George W. Mansfield
by Bentley Knight atty

THE NATIONAL LITHOGRAPHING COMPANY,
WASHINGTON, D. C.

UNITED STATES PATENT OFFICE.

ALBERT L. ROHRER, OF LYNN, AND GEORGE W. MANSFIELD, OF MELROSE, MASSACHUSETTS, ASSIGNORS TO THE THOMSON-HOUSTON ELECTRIC COMPANY, OF CONNECTICUT.

SWITCHBOARD FOR POWER-STATIONS.

SPECIFICATION forming part of Letters Patent No. 508,641, dated November 14, 1893.

Application filed March 5, 1891. Serial No. 383,873. (No model.)

*To all whom it may concern:*

Be it known that we, ALBERT L. ROHRER, residing at Lynn, in the county of Essex, and GEORGE W. MANSFIELD, residing at Melrose, in the county of Middlesex, State of Massachusetts, citizens of the United States, have invented a new and useful Improvement in Switchboards for Electric Lighting and Power-Stations, of which the following is a specification.

Our invention relates to improvements in switch-boards for electric lighting and power stations wherein a number of generators are connected in multiple and are provided with individual indicating, regulating and switching devices, and with automatic circuit breakers which act to disrupt the circuit of any generator when the load upon it is excessive.

Our improvements relate to means for facilitating the replacement or resetting of the automatic circuit breakers when two or more of them have operated to break their respective circuits, and also to an improved arrangement of the potential indicating and regulating appliances.

Figure 3:
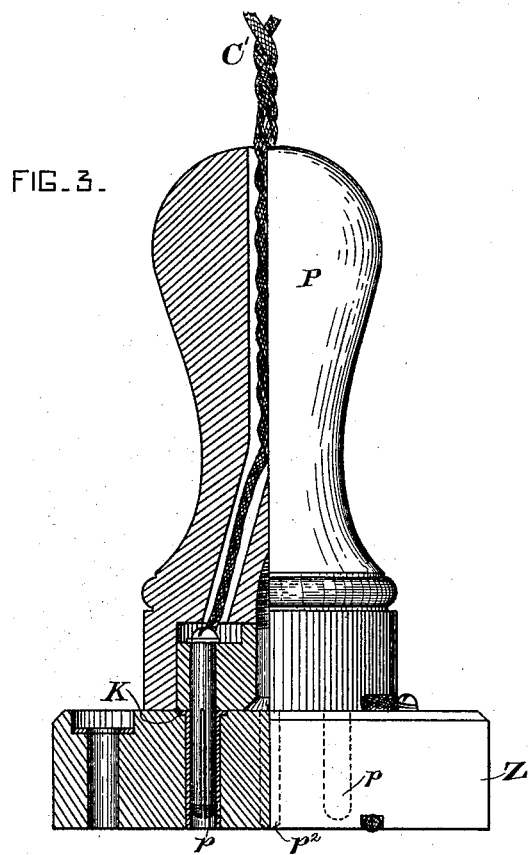
Figure 4:
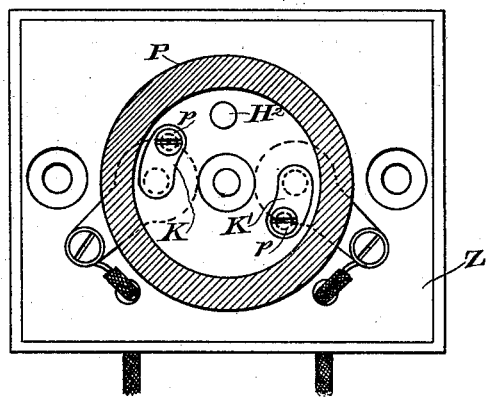

Figures 1 and 2 of the accompanying drawings are respectively a front and a side elevation of a switch board embodying our improvements; Figs. 3 and 4 respectively an elevation and plan partly in section, of our improved connecting plug for the potential indicator.

Two or more generators $D, D', D^2$ are connected in multiple to the omnibus wires $O, O'$, thence to the external feeders $a, b, c, d$, and $C, D, F$. In the individual connections of these generators are included the usual double pole switches $S, S', S^2$, ammeters $A, A', A^2$ and automatic electro-magnetic circuit interrupting devices $B, B', B^2$. These circuit interrupting devices may be of any ordinary or suitable type, and are shown as comprising each a magnet with its coil in the individual connection and controlling a switch, also located in said connection. The switch board is also provided with customary potential regulating devices for the several generators, here shown as rheostats $R, R', R^2$ in circuit with the shunt field coils. The ammeter $A^3$ is included in the common return or connection to the omnibus wire $O'$ so as to indicate the total current. In case the load increases beyond the amount which has been set as that which the generators can safely furnish, the circuit breakers or interrupters $B, B', B^2$ disconnect the machines from the circuit and prevent damage. If now, it should be attempted to reset or close any one of these circuit breakers while the load on the external circuit was greater than one machine could safely supply, the automatic circuit breaker would instantly operate to again release the switch and open the circuit, thus rendering it impossible to set the switch. To overcome this difficulty, it has been usual to have a switch in the omnibus wire, which, on the operation of the circuit breakers can be opened and kept open till all the automatic circuit breakers are put into their closed condition, when on closing this omnibus switch, the circuit is simultaneously established through all the connections. But this is undesirable, as the switch would usually have to be placed in an inconvenient position, besides requiring an extra switch and an additional break in the circuit. We attain the same result by means of a resetting device engaging with all of said circuit interrupting devices simultaneously, so as to reset them all at the same time, and bring no undue load on any one generator. This resetting device comprises a system of levers $L', L^2, L^3$, engaging with the switching devices of the circuit interrupting devices and operated by a handle $H$, whereby all the circuit breakers or automatic circuit disrupting devices may be placed in a closed circuit condition simultaneously, so that the circuit connections are then such that any one of the generators $D, D', D^2$ takes only its normal load, the abnormal conditions which provoked the operation of the automatic circuit opening device, having of course been remedied. With regard to this resetting device, we do not wish to be confined to the exact construction or arrangement shown, but consider that our invention comprises any resetting device common to two or more switching devices in the individual circuit connections of two or more generators in multiple are in combination with automatic circuit breaking devices. Thus it is not necessary that the switching devices which are thus reset should be the same as those released by the circuit breakers. For example, the resetting levers could obviously be applied to the individual double pole switches S, S', S². In that case, on the operation of the automatic circuit breaker, the double pole switch would first be opened, the automatic circuit breakers then reset, and finally the double pole switches simultaneously reset altogether by means of the resetting device.

When it is desired to take the potential of the current applied by any one of the generators D, D', D², a volt indicator may be moved along the shelf X, to a convenient position, and a plug P at the end of the cable C' leading to its terminal binding posts P², P', inserted into a socket Z, Z', Z² provided for its reception. There are three of these sockets or sets of terminals Z, Z', Z² connected to the circuits of the respective generators, so that when a plug is put in any socket, the volt meter will indicate the potential of the corresponding generator. The attendant then noting the potential makes whatever adjustment may be required on the appropriate rheostat R, R', R², to balance the load between the different generators in a proper manner. The socket Z and plug P are made in a special manner, as indicated in Figs. 3 and 4. The terminals of the two wires of the cable C', are respectively attached to the two pins $p$ in the plug, which enter corresponding holes in contact plates K, K' of the socket. In addition to these pins there is provided another pin $p^2$, which enters into the hole H², Fig. 4, the object of which is to make it impossible to connect the coils of the volt indicator V in circuit in a reverse direction from that indicated, the pin $p^2$ making it impossible for a wrong connection to be established. The sockets Z, Z', Z² are made interchangeable, so that the plug P will fit any one of them.

One advantage of the use of the resetting lever is, that it enables the switch levers, which are necessarily placed high up and out of convenient reach, to be conveniently operated from below, while at the same time, the resetting switch, when it is returned to its normal position, does not tend to pull the switch back, or to be held up by the same, or to interfere in any manner with its operation, the two switches not being directly connected.

What we claim as new, and desire to secure by Letters Patent, is—

1. The combination with two or more generators connected in multiple, of automatic circuit breakers in their respective connections, and a resetting device engaging with switching devices in each of said circuits so as to close the circuits simultaneously, substantially as described.

2. The combination with two or more generators connected in multiple, of automatic circuit breakers in their respective connections, and a resetting device for engaging with the switching devices of all said automatic circuit breakers, so as to simultaneously reset them.

3. A central power station having two or more generators connected with omnibus bars, an automatic circuit breaker in circuit between each generator and said bars, and a resetting device adjacent to all of said circuit breakers and adapted to simultaneously reset them, substantially as described.

4. A central power station having a plurality of generators feeding into omnibus bars, an automatic circuit breaker in circuit between each generator and said bars, said circuit breakers each comprising a switch lever, and a resetting lever engaging with all of the switch levers, substantially as described.

5. A central power station having a plurality of generators connected with omnibus bars, an automatic circuit breaker in circuit between each generator and said bars, said circuit breakers each comprising a magnet and a switch lever controlled thereby, and a resetting device consisting of a lever engaging with each of said switch levers, substantially as described.

6. A central power station having two or more generators feeding into omnibus bars, an automatic circuit breaker in circuit between each generator and said bars, said circuit breakers each comprising a magnet and a switch lever controlled thereby, and a resetting device consisting of a rock shaft carrying a plurality of arms adapted to engage with said switch levers, but not connected thereto, substantially as described.

7. In a switch board the combination with several sets of fixed terminals, a shiftable volt indicator adapted to connect with any of said sets of terminals, and a shelf upon which said volt indicator is shiftably supported.

ALBERT L. ROHRER.
GEO. W. MANSFIELD.

Witnesses:
JOHN W. GIBBONEY,
BENJAMIN B. HULL.